United States Patent [19]

Yamashita et al.

[11] 4,115,175

[45] Sep. 19, 1978

[54] METHOD FOR MANUFACTURING SYNTHETIC RESIN PACKED PRODUCT ASSEMBLY

[75] Inventors: Kazuo Yamashita, Kawanishi; Yoshikazu Yokose, Ikeda; Masatake Akao; Koichi Hirakawa, both of Kawanishi; Katsuhiko Iho, Hirakata; Takashi Shibano, Kawanishi, all of Japan

[73] Assignee: Matsushita Electric Industrial Co., Ltd., Osaka, Japan

[21] Appl. No.: 832,915

[22] Filed: Sep. 13, 1977

[51] Int. Cl.² .................... B29C 13/00; B29G 7/00
[52] U.S. Cl. ................................ 156/172; 264/137;
 264/236; 264/272; 264/347; 427/116; 427/369;
 427/385 R; 427/386; 427/443
[58] Field of Search .............. 264/36, 135, 137, 272,
 264/236, 347; 156/51, 52, 169, 172, 155;
 427/116, 369, 377, 386, 443, 385 R

[56] References Cited

U.S. PATENT DOCUMENTS

| 2,743,308 | 4/1956 | Bardsley | 264/255 |
| 3,247,010 | 4/1966 | Dowling | 427/415 |

FOREIGN PATENT DOCUMENTS 507,768 7/1939 United Kingdom ............ 264/236

Primary Examiner—Willard E. Hoag
Attorney, Agent, or Firm—Wenderoth, Lind & Ponack

[57] ABSTRACT

The method of the present disclosure includes preparing a coil which is impregnated with resin to form a resin packed coil, in which the resin is still in a liquid phase, immersing the resin packed coil into a wax in the liquid state, hardening the wax adhering around the resin packed coil, hardening the resin which is impregnated in the coil, and removing the wax, thus obtaining a resin packed coil assembly where the resin is hardened and surrounds the coil.

14 Claims, 7 Drawing Figures

METHOD FOR MANUFACTURING SYNTHETIC RESIN PACKED PRODUCT ASSEMBLY

The present invention relates to a method for manufacturing a product or material which is packed with synthetic resin material without use of any molding blocks.

Before the description proceeds, it is to be noted that in the method of the present invention for manufacturing a product, the product is particularly directed, as one example, to a synthetic resin packed coil assembly for used in electric appliances.

Conventionally, the method for manufacturing the synthetic resin packed coil assembly has been carried out by an injection molding through steps of; (a) forming a wound spiral having a plurality of turns of insulated wire (referred to as raw of bare coil, hereinbelow), (b) accommodating the raw coil in molding blocks, (c) injecting molten synthetic resin under substantially vacuum atmosphere so as to allow the synthetic resin to penetrate into interstices among the bundled turns of the wire, and (d) ejecting, after the synthetic resin has hardened, the synthetic resin packed coil assembly.

However, according to the conventional method as described above, there are disadvantages that (i) it is necessary to prepare, for manufacturing a number of synthetic resin packed coil assemblies, a comparatively large number of molding blocks, since it takes a comparatively long time for the synthetic resin to harden in the molding block, (ii) it is necessary to prepare different kinds of molding blocks for different types of raw coils, (iii) it involves a lengthy procedure of engaging and disengaging the molding blocks, and (iv) it is necessary to have the molding block cleaned and lubricated for facilitating the separation of the completed synthetic resin packed coil assembly from the molding block.

Although there have been attempted various methods to eliminate such disadvantages and to complete the synthetic resin packed coil without use of molding blocks, none of them has succeeded in perfecting a method which is undustrially acceptable, due to a lack of stiffness of synthetic resin provided on the raw coil.

Accordingly, a primary object of the present invention is to present a method for manufacturing a product or naterial which is packed with synthetic resin without use of any molding blocks.

Another object of the present invention is to present a method of the above described type which includes steps for reinforcing the adhesion of the synthetic resin provided over the raw coil.

In order to accomplish these and other features and objects of the present invention, the hardening of the synthetic resin is carried out by coating the synthetic resin packed coil with a material easily melted at a certain temperature (referred to as hot-melt material hereinbelow) such as wax, for preventing the resin from dripping down or oozing out before the resin becomes hardened.

According to the present invention, first, the raw coil is impregnated with a molten thermosetting resin for filling the raw coil with such thermosetting resin in the interstices thereof and causing the thermosetting resin to adhere around periphery of the raw coil, so as to form a synthetic resin packed coil.

It is to be noted here that the term "synthetic resin packed coil" used herein indicates the coil which is coated with synthetic resin in a molten state, while the term "synthetic resin packed coil assembly" indicates the coil which is coated with the synthetic resin in a hardened state.

Secondly, the synthetic resin packed coil is immersed into a solution of hot-melt material such as wax which has a melting point temperature higher than the initial hardening temperature of the resin, at which initial hardening temperature, the resin is hardened, below the melting point of the wax. During this second step, the temperature of the wax is then carefully adjusted in order for the wax to become hardened or semi-hardened without forming any undesirable cracks in the hardened wax.

Thirdly, the temperature is raised to a sufficient degree to cause the resin hardened, and thus, the synthetic resin packed coil assembly is obtained. During the third step, the adhering wax may be removed when the case is such that the melting point of the wax is below the hardening point of the synthetic resin. However, since the wax itself is an insulating material, it is not always necessary to completely remove the adhering wax.

Therefore, by providing the hardened wax around the synthetic resin packed coil, the adhering and hardened wax serves as molding blocks for maintaining the molten synthetic resin evenly around the raw coil.

Since one of the purposes for providing the hardened or semi-hardened wax around synthetic resin coil is to prevent the resin from oozing out, it is preferable to prepare a precise hardening schedule for the above described third step, in which schedule, the rise of the temperature may preferably be started after the resin has begun the initial hardening process where the degree of viscosity of the resin increases so that the possibility of the resin to oozing out is reduced. Thereafter, the increase of the temperature may favorably proceed to complete the initial hardening of the resin and, at the same time, may favorably start melting the adhering wax.

It is to be noted that the above method, described as starting the initial hardening of the resin at a temperature below the melting point of the wax, after which the wax is carefully adjusted in temperature to a hardened or semi-hardened state, may be modified to start the initial hardening of the resin simultaneously with the hardening or semi-hardening of the wax.

It is further to be noted that the hot-melt material, exemplified by wax, may be changed to other materials which have similar characteristics to the wax, for example, thermoplastic material such as polyethylene or nylon.

It is also to be noted that the wax used for the present invention is of a type which melts rapidly at the melting temperature to a liquid state having comparatively low viscosity. The wax may preferably be an animal or plant wax or mineral wax or synthetic wax.

In order to have the present invention effectively carried out, it is preferable to use a wax having a comparatively even molecular weight. Examples of the thermosetting resin which may be employed are epoxy resin, polyester resin, polyurethane resin, and polybutadiene-type resin. In the step where the synthetic resin packed coil is immersed into the wax in liquid state, the thermosetting resin might become mixed wih the wax at the boundary therebetween due to the compatability between the synthetic resin and the wax. In order to avoid such an undesirable mixture, the solubility parameter, defined by the square root of cohesive energy density, of the thermosetting resin provided with hardening agent and accelerator must be significantly different, during the hardening step of the resin, from that of the wax in the liquid state. The difference of the solubility parameter between the synthetic resin and wax should be high enough for the hot-melt material to be substantially imcompatible with the thermosetting resin.

The features of the present invention will become further apparent from the following descriptions taken in conjunction with preferred embodiments thereof with reference to the accompanying drawings, in which.

Before the description of the present invention proceeds, it is to be noted that there are given three typical embodiments of the process for forming the synthetic resin packed coil assembly with reference to the accompanying drawings.

FIRST EMBODIMENT

A raw coil (a coil which is formed by a wound spiral having a plurality of turns of insulated wire) which is enveloped in an insulating layer is immersed into a solution of thermosetting resin, such as epoxy resin, for impregnating the raw coil with the resin. Instead of impregnating the raw coil with resin, the raw coil can be filled with or sprayed with such resin. Thereafter, the raw coil, impregnated with the resin, is immersed into a solution of hot-melt material such as wax for completely surrounding the resin impregnated raw coil in an air tight condition with the wax. The wax adhering around the resin impregnated raw coil is then hardened or semi-hardened in order to prevent the impregnated resin from dripping. Under such conditions as described above, the synthetic resin is hardened. It is to be noted that the wax adhering around the resin impregnated raw coil serves as a molding block such as those employed in the conventional method for manufacturing the synthetic resin packed coil assembly. Accordingly, it is necessary to prevent the hardened or semi-hardened wax from being formed with cracks, or at least to keep the formed cracks extremely small in size. Otherwise, the impregnated resin which has not yet hardened may leak out through the cracks. For this reason, it is preferable to keep the amount of impregnated resin as small as possible during the step when the raw coil is impregnated with the molten synthetic resin, since a large amount of resin may establish an undesirable path of flow during the hardening step of the wax. Furthermore, the path of flow may incessantly discharge the unhardened resin even after the wax has been hardened. The amount of impregnated resin which is, from the precise aspect, adhering on the surface of the insulating layer is estimated to be below 0.1g/cm$^2$, although this estimate may vary depending on the amount of filler contained in the synthetic resin.

The difference of the solubility parameter in the solution between the synthetic resin and wax, as discussed above, is presented in the graph of FIG. 1, in which the abscissa and ordinate represent the difference of the solubility parameter and the weight percentage of the amount of the resin wax mixture, respectively.

Figure 1:
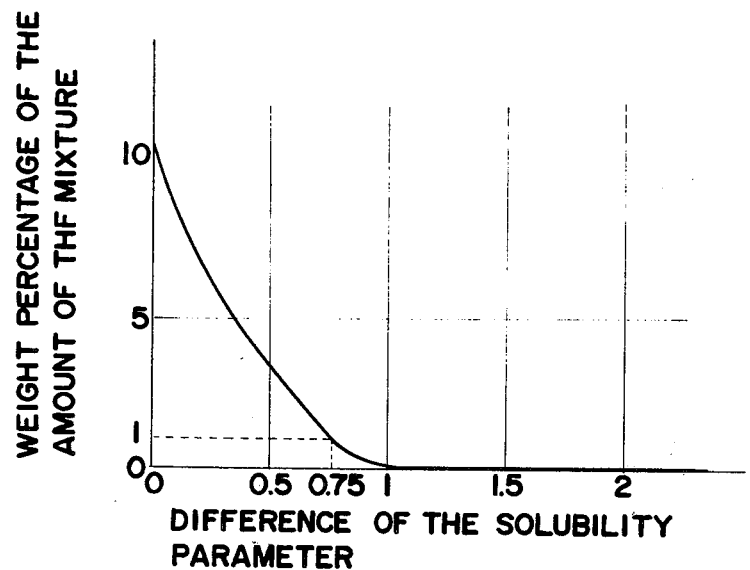
FIG. 1 is a graph showing the relation between the difference of the solubility parameter and the weight percentage of the mixture.

Referring to FIG. 1, the curve shown in the graph is obtained when the synthetic resin used for the thermosetting material is epoxy resin or polyester resin and the hot-melt material is a common wax. As is apparent from graph, the weight percentage of the mixture increases rapidly as the difference of the solubility parameter decreases below 1. From the tests carried out by the present inventors, it is found that a comparatively large void volume will be produced in the synthetic to more than 1%, which void volume may cause an undesirable partial discharge by the supplied voltage, resulting in partial discharge by the supplied voltage to result in an electrical deterioration. Accordingly, it is practical to select the difference of the solubility parameter in the region above 0.75, and preferably above 1.0.

In addition to the difference of the solubility parameter, variation in the above described compatibility between the resin and wax is more or less influenced by the crystallizability, stereo regularity and molecular weight, and other factors.

For the purpose of maintaining the impregnated resin in an evenly distributed condition around the raw coil, it is preferable to envelop the raw coil with fibrous material having bundles of thin, high strength fibers such as glass tape, glass rovings or other bonded fabrics so that the impregnated resin may be evenly distributed around the raw coil by the effect of capillarity or surface tension.

Furthermore, by wrapping the raw coil with the high strength fibrous material, such as glass tape or glass rovings as described above, in the form of spirals having a number of turns, and by taking advantage of the present invention where the raw coil wrapped wih high strength fibrous material is impregnated with thermosetting resin, there will be produced an insulating layer of resin in a form of fiber reinforced plastic (FRP) which includes high strength fibrous material wherein no void is liable to be formed, which void is usually caused by leakage of the resin provided around the raw coil.

The method for forming the synthetic resin packed coil assembly wherein synthetic resin is reinforced by the fiber is given hereinbelow with reference to FIGS. 2 and 3. (i)

Figure 2:
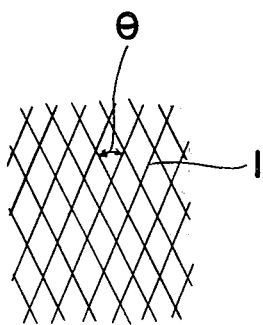
FIG. 2 is a fragmentary plan view showing the arrangement of reinforcing material.
Figure 3:
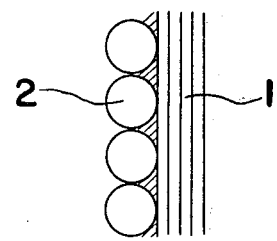
FIG. 3 is a fragmentary sectional view showing a part of coil and a layer of reinforcing material.

The high strength fiber employed for reinforcing material is wound around the raw coil 2 in a spiral form, in two directions, with the degree $\theta$ of interlocking between the crossing fibers being arranged within a range of 5°-90°, as shown in FIG. 2. (ii)

The fiber in one layer of spiral wound fibrous material and the fiber in other layers of spiral wound fibrous materials which are provided over and under said one layer are arranged to have the angle interlocking therebetween within a range of 5°-90°. (iii)

The fiber reinforcing material may be used in a form of roving or in a form of tape. (iv)

The weight percentage of the high strength fiber reinforcing material with respect to impregnated amount of thermosetting resin is preferably more than 30%.

It is to be noted here that the method described in (i) and (ii) may be carried out solely or in combination with the method described in (iii).

The purpose for winding the fiber reinforcing material with such crossing relation described above is to improve the mechanical strength of the layer of the FRP.

Figure 4:
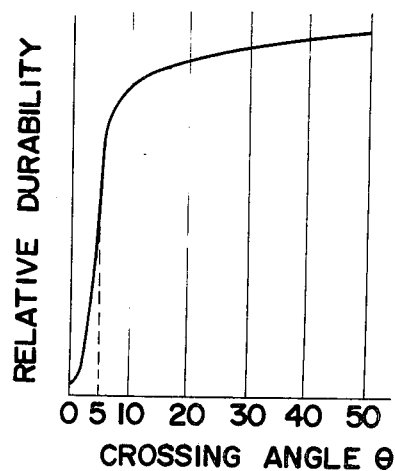
FIG. 4 is a graph showing the relation between crossing angle $\theta$ of the reinforcing material and a relative durability of the FRP layer.

In the case where the glass roving is wound in spiral in one direction without forming any crossings of the fibers, the mechanical strength of FRP layer in a direction perpendicular to the running direction of the fiber is so weak that the resistance in that direction is not more than the resistance of the resin only. For example, in one case the tension in a direction parallel to the running direction of the fiber showed the resistance of 30 Kg/mm, while the same in the perpendicular direction showed the resistance of 7 Kg/mm. Furthermore, where the fibers extended in one direction, there may be produced a crack in a direction perpendicular to the fibers, due to internal stress exerted in all directions during the cooling step of FRP layer. Even in the case where the degree of crossing between the fibers is comparatively small, the possibility of producing a crack in a direction perpendicular to the running direction of the fiber is still high. Such crack may cause an undesirable partial discharge therethrough while the coil is being supplied with electrical power and may result in electrical deterioration. The relation between the crossing angle $\theta$ and the relative durability or life of the FRP layer with respect to the expected cracks in the FRP layer is shown in graph of FIG. 4, wherein abscissa and ordinate represent crossing angle $\theta$ and relative durability, respectively. As is apparent from the graph, the rate of increase in relative durability of the FRP layer tends to decrease when the crossing angle $\theta$ is at about 5°–90°.

It is to be noted that an inadequate amount of the high strength fibrous material in the FRP layer results in a weak FRP layer, since the layer is more likely to show the characteristics of the resin rather than FRP. Especially when the layer is heated to such a high temperature as to show a high dgree of expansion in dimensions of the resin, an interface between the resin and the high strength fibrous material will be deteriorated to further deteriorate the mechanical and electrical characteristics, simultaneously. Accoringly, from these facts, it is necessary to have a suitable amount of fibrous material contained in the layer. As for the FRP layer employed in the present invention, it is required to contain the fibrous material in an amount of more than 30% by weight in the layer for maintaining preferably mechanical and electrical characteristics.

In addition to the above described method, there are provided further steps for maintaining the required amount of resin to be impregnated in the coil.

Figure 5:
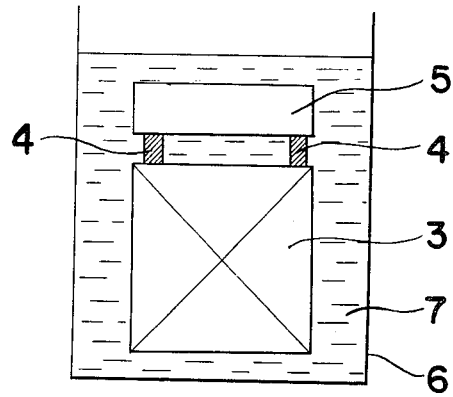
FIG. 5 is a cross sectional view showing a resin packed coil, provided with a dummy coil, being immersed in a solution of wax.

Referring to FIG. 5, a ring-shaped member, namely a dummy coil 5, having similar configuration to the coil 3, is provided over the coil 3 through a suitable spacer element 4. Such arrangement of coil 3, provided with the dummy coil 5, is immersed into the resin 7 in liquid state, in a container 6, as shown in FIG. 5, for impregnating the coil 3, as well as the dummy coil 5 with the resin. Thereafter, the resin packed coil 3 and the dummy coil 5 are taken out from the container 6 and in turn, immersed into the wax in liquid state as in the manner described above. Then, the adhering wax is hardened, and next the resin is hardened. Before the wax is completely hardened, the impregnated resin, still in liquid form, is likely to drip down from the resin packed coil 3 so as to lose some amount of the resin in the resin packed coil 3. However, while the resin is dripping down from the resin packed coil 3, the resin in the dummy coil 5 also drips down towards the resin packed coil 3 to supply the coil 3 with the resin. Accordingly, the resin in the resin packed coil 3 is substantially maintained in the required amount.

In order to sufficiently and effectively supply the coil 3 with the resin, it is preferably to design the dummy coil 5 in the following manner. The configuration of the dummy coil 5 is similar to that of the coil 3, i.e., ring shape, for evenly supplying the resin around the ring shaped coil 3. For sufficiently supplying the coil 3 with the resin, in other words, for sufficiently storing the resin in the dummy coil 5, the dummy coil 5 may be provided with recesses or grooves, or otherwise, a material capable of holding resin, such as nonwoven fabric mat, may be wrapped therearound, or in other cases, the dummy coil 5 may be provided with an external container which suitably supplies the resin to the dummy coil 5.

It is to be noted that the dummy coil 5, described as provided over the coil 3 before the coil 3 is immersed into the resin in liquid state, may be provided over the coil 3 after the coil 3 is immersed into the resin. In this case, the dummy coil 5 is previously provided with the resin.

The description hereinbelow relates to the characteristics of the hot-melt material represented by wax, and more particularly, to the transition of the wax between liquid phase and solid phase. Although the transition of the wax between the liquid phase and solid phase is not so simple as to be fully explained here, due to various conditions of the crystallization of the wax and molecular weight, etc., with respect to different types of waxes, a general case for such transition is explained with reference to FIGS. 6a and 6b.

Figure 6A:
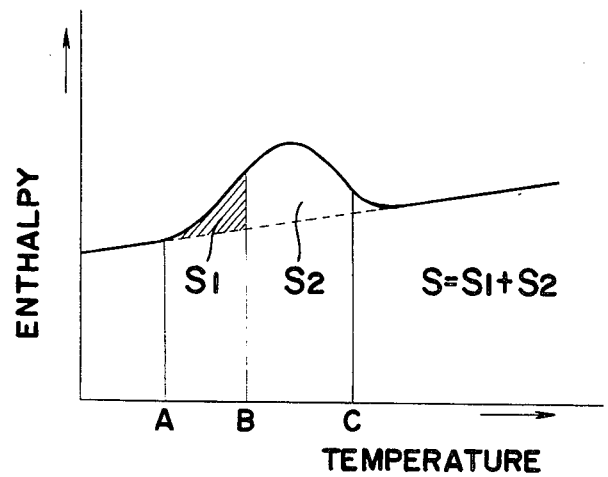
FIG. 6a and 6b are graphs showing the relation between the temperature of the wax and the enthalpy thereof.
Figure 6B:
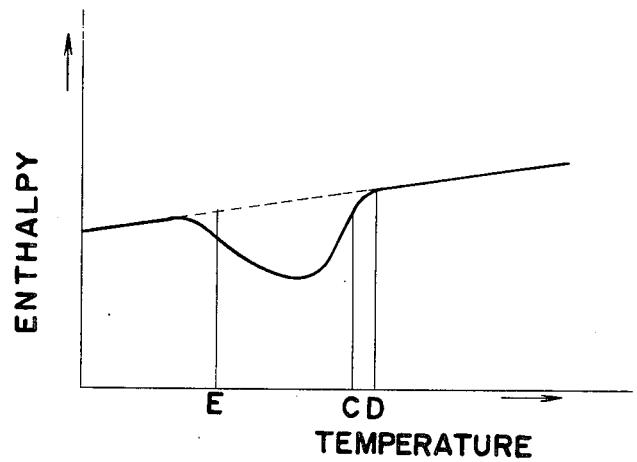

A graph in FIG. 6a shows the characteristics of transition of the wax from solid phase to liquid phase as the temperature is increased while a graph in FIG. 6b shows the characteristics of transition of the wax from liquid phase to solid phase as the temperature is decreased. Such relation is obtained by using differential scanning calorimetry. In each graph, the abscissa and ordinate represent temperature and enthalpy, respectively, and the solid line shows a change of enthalpy while the dotted line shows a reference line. An area S enclosed by the solid line and dotted line is proportional to the heat of fusion of the material.

Referring particularly to FIG. 6a, when the wax in solid phase is heated up to temperature A, a part of wax starts to melt. As the wax is further heated to temperature B, the wax includes a liquid phase and a solid phase. At the temperature B, a line is extended to indicate that temperature B divides the area S into two areas, $S_1$ and $S_2$ in which the area $S_1$ occupies the region below the temperature B and the area $S_2$ occupies the region above the temperature B. At the temperature B, the amount of fused wax is proportional to a ratio of area $S_1$ to area S. Such ratio in percentage ($S_1/S \times 100$) is referred to a fusing rate, hereinbelow. Further rising in temperature completes the fusing of the wax. In the step of fusing the wax, a melting point which is equal to temperature C is determined by a method explained in ASTM D127.

Referring now particularly to FIG. 6b, when the wax in liquid phase is cooled down to temperature D, a part of the wax starts hardening. At the temperature E, 80% of the wax is in solid phase, while 20% thereof is in liquid phase, which are mixed with each other. In other words, at the temperature E, the fusing rate is approximately 20%. According to the present invention, the term "semi-hardened" used here indicates the wax which has the fusing rate within a range of 10% to 70%, while the term "hardened" is used when the fusing rate is below 10%. When the wax is fused to show the fusing rate of 70% or more, the mechanical strength of the wax is extremely reduced resulting in loss of its ability to maintain the molten resin around the coil. Thus, resin may leak out therefrom.

Accordingly, it is necessary to start hardening the resin below the fusing rate of 70%.

According to the tests carried out by the inventors, it is found that the temperature difference between the temperature of the resin packed coil and that of the liquid-state wax is preferably as little as possible because of the following reasons. First, if the temperature difference is so large that the resin packed coil, before immersing into the wax in liquid state, is comparatively cold, then the increase in temperature of the resin packed coil during hardening of the wax results in expansion of the resin beyond tolerable limits. Secondly, if the temperature difference is comparatively large, the wax adhering to the resin packed coil surface shrinks to a comparatively high degree during the semi-hardening or hardening step. Thirdly, if the temperature difference is comparatively high, the hardening step will not be effected uniformly. These three reasons will cause the adhering wax to form undesirable cracks therein. According to the tests, it is found that the temperature difference is preferably within 80° C. After having immersed the resin packed coil into the wax in liquid state, the ambient temperature is maintained within 50° C under the melting point so as to gradually effect semi-hardening or hardening of the wax from the peripheral surface therearound. In other words, the hardening process of the wax starts from the wax adhering onto the surfaces of the resin packed coil. During the hardening of the wax, the temperature of the wax is carefully reduced to maintain a shrinkage factor of the wax, as a whole, within 10%, and to effect the shrinkage evenly around the wax to prevent the wax from forming cracks. Furthermore, the initial hardening temperature of the resin is preferably a temperature which is within 50° C under the melting point. Since the immersion of the coil into the resin in liquid state is effected through a batch system, where a number of coils are immersed into the liquid-state resin at the same time, and such operation is repeated, it is necessary to keep the resin in good condition throughout the operation. Accordingly, the temperature difference between the temperature of the liquid-state resin and the initial hardening temperature of the resin is preferably about 20° C or more depending on the type of resin. If such temperature difference is less than 20° C, the resin in liquid state in the container may readily increase in viscosity so as not to be usable any longer, thus, the usable time of the resin being reduced undesirably.

Specific conditions for effecting the first embodiment of the present invention in three different temperature arrangements, as examples, are given hereinbelow. In the first temperature arrangement, the raw coil provided with glass tape or roving wound in a number of turns is impregnated with the epoxy resin in liquid state at the temperature of 80° C. Then, the resin packed coil is immersed into the wax in liquid state at the temperature of 100°-115° C, said wax having a melting point of 122° C. After the wax adhering therearound is hardened, the impregnated epoxy resin is initially hardened at the temperature of 100° C, and then the temperature is raised to 150° C for removing the wax and for completing the hardening of the epoxy resin. Thus, the epoxy resin packed coil assembly is obtained.

In the second temperature arrangement, the raw coil provided with glass tape or roving wound in a number of turns is impregnated with the liquid-state epoxy resin at the temperature of 50° C. Then, the resin packed coil is immersed into the well-stirred liquid-state wax at the temperature of 83° C, said wax having a melting point of 93° C. After the wax adhering therearound is hardened, the impregnated epoxy resin is initially hardened at the temperature of 75° C, and then the temperature is raised to 100° C for removing the wax and for completing the hardening of the epoxy resin. Thus, the epoxy resin packed coil assembly is obtained.

In the third temperature arrangement, the raw coil provided with glass tape or roving wound in a number of turns is impregnated with epoxy resin in liquid state at room temperature (25° C). Then, the resin packed coil is immersed into the well-stirred liquid-state wax at the temperature of 68° C, said wax having a melting point of 72° C. After the wax adhering therearound is hardened, the impregnated epoxy resin is initially hardened at the temperature of 63° C, and then the temperature is raised to 100° C for removing the wax and for completing the hardening of the epoxy resin. Thus, the epoxy resin packed coil assembly is obtained.

As understood from the foregoing description, the method of the present invention can be effected with various types of resins having different hardening temperatures by simply employing an optimum wax having a suitable melting point. With the above described method, it is possible to obtain a resin packed coil assembly without using any molding blocks.

SECOND EMBODIMENT

The raw coil which is enveloped in the insulating layer is immersed into the epoxy resin in liquid state for impregnating the raw coil with the resin. Thereafter, the resin packed coil is immersed into the wax in liquid state. If desired, the operation of immersion into the wax in liquid state may be effected several times. Or in other cases, the liquid-state wax can be sprayed onto the resin packed coil. The coating of the wax through spraying operation has its advantage in forming a thin layer of wax through one spraying operation, so that the wax can be uniformly applied around the resin packed coil with hardly any cracks being formed therearound. Furthermore, as described in the first embodiment, the wax hardly forms any cracks in the case where the excess resin is thoroughly removed and the temperature difference between the resin packed coil and the liquid-state wax is maintained as little as possible. Thereafter, the epoxy resin is initially hardened within the coat of hardened wax, and then, the temperature is raised to complete the hardening of the resin and to remove the wax, thus, the resin packed coil assembly is obtained.

THIRD EMBODIMENT

The raw coil which is enveloped by the insulating layer is immersed into the epoxy resin liquid state for impregnating the raw coil with the resin. Thereafter, the resin packed coil is immersed into the wax in liquid state. Several operations of immersion of resin packed coil into the liquid-state wax is preferred, as described in the second embodiment. In repeating the operations of immersion, it is preferable to provide a time interval before effecting the next operation so as to harden the wax adhering in the previous operation. Then, the impregnated resin is hardened in the manner described above. The reason for forming layers of thin wax at each operation of immersion is to prevent the hardened wax from forming cracks, and the reason for repeating the operation of immersion is to fill pin holes or small cracks which may unexpectedly be formed, in the previous wax layer, by an mechanical impact produced during the process of manufacturing, and also to reinforce the layer of wax. Of course, removal of the excess resin and the maintenance of minimum temperature difference between the resin and the coil are desirable for preventing the wax from forming cracks, as described in the previous embodiments. Thereafter, the temperature is raised to complete the hardening of the resin and to remove the wax, thus, the resin packed coil assembly is obtained. It is to be noted that the method described in the first embodiment is available for the second and third embodiments.

According to the synthetic resin packed coil assembly manufacturing method of the present invention, there are such advantages as described hereinbelow:
(a) since there is no necessity to employ molding blocks, steps relating to molding blocks such as constructing the blocks, injecting the resin and ejecting the piece, are eliminated.
(b) since it is possible to control the thickness of the impregnated resin to a thickness required to insulate the coil, the resin impregnated in the coil is not more than is necessary, thus no waste is produced; and
(c) since the resin is not likely to leak out from the wax during the process of hardening of the resin, it is possible to obtain a good insulating layer of resin having no voids.

Although the present invention is described as employed for manufacturing synthetic resin packed coil assembly, it is possible to employ the present invention for manufacturing other electrical appliances or electrical elements, or for manufacturing resin packed elements such as cylindrical FRP or plate members where the product is impregnated with resin.

In addition to the various methods presented above for preventing the wax from forming cracks, other methods can be employed, including the use of a filler, serving as reinforcing agent, such as silica, alumina or magnesia, so as to reduce the expansion coefficient of the wax and to increase the heat conductivity. According to tests, it is found that the wax hardly produces cracks when the heat conductivity is equal to or more than $1 \times 10^{-3}$ cal/cm.sec.° C due to even distribution of the heat. Furthermore, it is preferable to employ a method of including high strength fabric material such as glass chips or glass fibers in the wax for increasing the strength of the wax. Such methods can be employed solely or in combination with the methods described in the above embodiments.

It is to be noted that the thermosetting resin described as represented by epoxy resin can be represented by polyester resin, polyurethane resin or polybutadiene-type resin, each having the same effect as that of the epoxy resin.

It is also to be noted that the steps for the method of the present invention, especially when hardening the resin, can be effected under a high pressure for eliminating voids which cause undesirable partial electric discharge, and thus improving the electrical characteristics.

Although the present invention has been fully described by way of examples with reference to the attached drawings, it is to be noted that various changes and modifications are apparent to those skilled in the art. Therefore, unless such changes and modifications depart from the scope of the invention, they should be construed as included therein.

What is claimed is:
1. A method for manufacturing a synthetic resin packed product assembly comprising
   (a) providing around an element to be packed with hardened resin a high strength fibrous material which is provided in a continuous form, said high strength fibrous material being wound around said element in spiral form in a number of turns to interlock the wound fibrous material with an interlocking degree between the crossing fibers being arranged within a range of 5°–90°;
   (b) impregnating said element, provided therearound with said fibrous material, with thermosetting resin in the liquid state to form a resin packed element;
   (c) immersing said resin packed element into a hot-melt material in the liquid state which is substantially incompatible with said thermosetting resin, said hot-melt material having a melting point at a temperature higher than the initial hardening temperature of said thermosetting resin, the solubility parameter difference between said hot-melt material and said thermosetting resin being above 0.75;
   (d) hardening said hot-melt material by decrease of temperature to cover said resin packed element in an air tight condition for preventing said impregnated thermosetting resin in liquid form from leaking out from said hardened hot-melt material;
   (e) hardening said thermosetting resin at a temperature below said melting point; and
   (f) removing said hardened hot-melt material from said element by increase of temperature, thereby obtaining said synthetic resin packed product assembly.
2. A method as claimed in claim 1, wherein said hot-melt material is hardened with a shrinkage factor of not more than 10% so as to prevent said hot-melt material from forming cracks.
3. A method as claimed in claim 1, wherin said hot-melt material starts hardening at that portion of the hot-melt material adhering onto the surface of the resin packed element.
4. A method as claimed in claim 1, wherein said hot-melt material is a wax selected from the group consisting of animal wax, plant wax, mineral wax and synthetic wax.
5. A method as claimed in claim 1, wherein said hot-melt material has a heat conductivity not less than $1 \times 10^{-3}$ cal/cm.sec.° C.
6. A method as claimed in claim 1, wherein hardening of said thermosetting resin is effected under pressure exerted on the hardened hot-melt material.
7. A method as claimed in claim 1, wherein said resin packed element is provided with means for supplying thermosetting resin thereto in a liquid state, such that during the step of hardening of said thermosetting resin the amount of resin in the resin packed element is maintained in a predetermined amount.

8. A method as claimed in claim 1, wherein said high strength fibrous material is glass tape or glass roving.

9. A method as claimed in claim 1, wherein said thermosetting resin is selected from the group consisting of epoxy resin, polyester resin, polyurethane resin, and polybutadiene-type resin.

10. A method as claimed in claim 1, wherein said element is a coil.

11. A method as claimed in claim 10, wherein said resin packed coil is provided with a ring-shaped member above the upper surface thereof, said ring-shaped member being impregnated with thermosetting resin in a liquid state to supply, during the step of hardening of said thermosetting resin, the thermosetting resin in a liquid state to maintain the amount of impregnated resin the resin packed coil at a predetermined amount.

12. A method as claimed in claim 1, wherein said hot-melt material is a mixture of wax and filler.

13. A method as claimed in claim 12, wherein said filler is an inorganic filler selected from the group consisting of alumina, silica and magnesia.

14. A method as claimed in claim 12, wherein said filler is a reinforcing agent selected from the group consisting of glass fiber and glass chips.

* * * * *